United States Patent
Gane et al.

(10) Patent No.: US 9,145,484 B2
(45) Date of Patent: Sep. 29, 2015

(54) MINERAL COMPOSITION, ESPECIALLY FOR USE IN PAPER FILLERS AND PAPER OR PLASTIC COATINGS

(75) Inventors: Patrick Arthur Charles Gane, Rothrist (CH); Olav Bergset, Birmingham, AL (US); George Saunders, Brandon, VT (US); Xueping Qiu, Rutland, VT (US); Dan Varney, Proctor, VT (US)

(73) Assignee: Omya International AG, Oftringen (CH)

( * ) Notice: Subject to any disclaimer, the term of this patent is extended or adjusted under 35 U.S.C. 154(b) by 117 days.

(21) Appl. No.: 13/991,510

(22) PCT Filed: Dec. 14, 2011

(86) PCT No.: PCT/EP2011/072768
§ 371 (c)(1),
(2), (4) Date: Jun. 4, 2013

(87) PCT Pub. No.: WO2012/080343
PCT Pub. Date: Jun. 21, 2012

(65) Prior Publication Data
US 2013/0251921 A1    Sep. 26, 2013

Related U.S. Application Data

(60) Provisional application No. 61/425,339, filed on Dec. 21, 2010, provisional application No. 61/452,981, filed on Mar. 15, 2011, provisional application No. 61/523,927, filed on Aug. 16, 2011.

(30) Foreign Application Priority Data

Dec. 16, 2010  (EP) ..................................... 10195360

(51) Int. Cl.
  C08K 3/26      (2006.01)
  C04B 14/28     (2006.01)
  C04B 28/02     (2006.01)
  C09C 1/02      (2006.01)
  C09C 3/04      (2006.01)
  D21H 17/67     (2006.01)
  B02C 23/12     (2006.01)
  B02C 23/18     (2006.01)
  B41M 5/52      (2006.01)
  C09D 129/04    (2006.01)
  D21H 19/38     (2006.01)
  D21H 21/52     (2006.01)

(52) U.S. Cl.
  CPC . *C08K 3/26* (2013.01); *B02C 23/12* (2013.01); *B02C 23/18* (2013.01); *B41M 5/52* (2013.01); *C04B 14/28* (2013.01); *C04B 28/02* (2013.01); *C09C 1/021* (2013.01); *C09C 3/041* (2013.01); *C09C 3/046* (2013.01); *C09D 129/04* (2013.01); *D21H 17/67* (2013.01); *C01P 2004/61* (2013.01); *C01P 2004/62* (2013.01); *C01P 2006/12* (2013.01); *C01P 2006/14* (2013.01); *C01P 2006/16* (2013.01); *C01P 2006/17* (2013.01); *D21H 19/38* (2013.01); *D21H 21/52* (2013.01); *Y10T 428/25* (2015.01)

(58) Field of Classification Search
  CPC ........................................................ C08K 3/26
  USPC ................................... 106/409, 464; 524/425
  See application file for complete search history.

(56) References Cited

U.S. PATENT DOCUMENTS

| | | | |
|---|---|---|---|
| 5,292,365 | A | 3/1994 | Delfosse |
| 2002/0102404 | A1 | 8/2002 | Nakai et al. |
| 2005/0004266 | A1* | 1/2005 | Kayano et al. ................ 523/210 |
| 2010/0040885 | A1 | 2/2010 | Ichimura et al. |

FOREIGN PATENT DOCUMENTS

| | | |
|---|---|---|
| EP | 1452489 A1 | 9/2004 |
| WO | 0002814 A1 | 1/2000 |
| WO | 0039222 A1 | 7/2000 |
| WO | 2004083316 A1 | 9/2004 |
| WO | 2005121257 A1 | 12/2005 |

OTHER PUBLICATIONS

The International Search Report for PCT Application No. PCT/EP2011/072768.
The Written Opinion of the International Searching Authority for PCT Application No. PCT/EP2011/072768.
Ridgway et al. "Achieving Rapid Absorption and Extensive Liquid Uptake Capacity in Porous Structures by Decoupling Capillarity and Permeability: Nanoporous Modified Calcium Carbonate." Transport in Porous Media (2006) 63:239-259.

* cited by examiner

*Primary Examiner* — Edward Cain
(74) *Attorney, Agent, or Firm* — Amster, Rothstein & Ebenstein LLP

(57) ABSTRACT

A mineral composition comprising mineral particles, said mineral particles, when in a densely compacted bed form, having a volume defined median pore diameter from 0.01 to 0.04 micrometer, and having an intruded total specific void volume of 0.1-0.3 cm$^3$/g. A specific advantage of this composition is that it as a component in a coating, allows the passage of ink solvent into the base paper while retaining the ink molecules on the surface.

11 Claims, 4 Drawing Sheets

MINERAL COMPOSITION, ESPECIALLY FOR USE IN PAPER FILLERS AND PAPER OR PLASTIC COATINGS

CROSS-REFERENCE TO RELATED APPLICATIONS

This application is a U.S. national phase of PCT Application No. PCT/EP2011/072768, filed Dec. 14, 2011, which claims priority to European Application No. 10195360.2, filed Dec. 16, 2010, U.S. Provisional Application No. 61/425,339, filed Dec. 21, 2010, U.S. Provisional Application No. 61/452,981, filed Mar. 15, 2011 and U.S. Provisional Application No. 61/523,927, filed Aug. 16, 2011.

TECHNICAL FIELD OF THE INVENTION

The present invention relates to mineral compositions with high adsorptive capacity. In particular the present invention relates to printing paper fillers and coatings with high adsorptive capacity.

BACKGROUND OF THE INVENTION

Mineral fillers are used on a large scale in paper manufacturing. Their function consists primarily of increasing the opacity of the paper and level of brightness. Relatively inexpensive mineral fillers include china clay, natural calcium carbonate such as ground calcium carbonate, precipitated calcium carbonate, talcum and calcium sulphates. In addition to optical properties, mineral fillers also influence weight, volume, porosity, mechanical properties, particularly bursting strength, the smoothness of the surface, and printing characteristics.

U.S. Pat. No. 5,292,365 discloses a single product which can be used equally as paper filler and as a coating pigment having
a) a rhombohedral or round particle shape
b) a steepness factor (Particle diameter in micrometers at 50% of mass/Particle diameter in micrometers at 20% of mass ($d_{50}/d_{20}$) of between 1.1 and 1.4
c) a ratio R (volume mass % of particles <1 micrometers/volume mass % of particles <0.2 micrometers) of 8-19 and
d) an average particle diameter of between 0.4 and 1.5 micrometers. The average particle diameter of the invented products is the particle diameter in microns, derived from the X-axis at a value on the Y-axis of 50% mass of the particles.

The top cut is between 4 and 7 micrometers. The term "top cut" refers to the size (in microns) of the coarsest particles of the product. For example, a top cut of 10 microns means that 100% of the particles are smaller than 10 microns. The inventors of the present invention will define the top cut by $d_{98}$ due to the fact that the 100% line is varying at least ±0.5% far up (error bar).

WO2009009553 discloses precipitated calcium carbonate compositions for coating exhibiting improved opacity, sheet gloss, print gloss, and brightness. The precipitated calcium carbonate compositions are characterized by having a crystalline aragonite content of greater than or equal to about 30% by weight relative to the total weight of the composition. Furthermore, less than or equal to about 10% by weight of particles are having a particle size less than or equal to about 0.25 micrometers. Less than or equal to about 4% by weight of particles have a particle size greater than or equal to about 2.0 micrometers, and a particle size distribution steepness factor (($d_{30}/d_{70}$)*100) of greater than or equal to about 50.

US patent application 2006292305 discloses a composition with a first pigment component comprising particulate ground calcium carbonate (GCC) having a particle size distribution (psd) steepness factor (($d_{30}/d_{70}$)*100) ranging from about 30 to about 45; and a second pigment component comprising particulate precipitated calcium carbonate (PCC) having a psd steepness factor ranging from about 55 to about 75 and a $d_{50}$ not greater than 0.5.

Canadian patent 1150908 discloses a calcium carbonate composition with a ratio R (% of particles <1 micrometers/% of particles <0.2 micrometers) greater than 3.5.

EP 1 452 489 A1 discloses a material for imparting thixotropy, the material comprising surface-treated calcium carbonate. The surface-treated calcium carbonate has been prepared by treating a calcium carbonate with fatty acids, resin acids, such as abietic acid, dehydroabietic acid and dihydroabiteic acid; silane coupling agents such as vinylsilane, aminosilane and mercaptosilane; resins such as polyethylene, polypropylene and urethane resins; and polymeric dispersants.

SUMMARY OF THE INVENTION

While prior art has focused almost solely on particle sizes, the inventors of the present invention have found that mean pore diameter of the mineral composition is of outmost importance for optimal adsorption.

Surprisingly, it has been found by the inventors of the present invention that segregation of larger versus smaller particles during application, e.g. coating on different supports, can lead to different pore structure of the final coating. Hence, the pore structure cannot be controlled by the particle size distribution only.

Furthermore, segregation of large ink/dye molecules on the paper surface is aided by surface size exclusion and a high pore volume coating, allowing the passage of ink solvent into the base paper while retaining the ink molecules on the surface. This suggests the need for a porous coating formulation. One object of the present invention is therefore to introduce mineral compositions with a carefully controlled pore size distribution and capillarity.

Another object of the present invention is to introduce such optimal absorption of the ink solvent into the paper mass, by adding mineral compositions with a carefully controlled pore size distribution and capillarity as paper filler.

Thus, one aspect of the invention is to provide a mineral composition comprising mineral particles, said mineral particles, when in a densely compacted bed form, having a volume defined median pore diameter from 0.01 to 0.04 micrometer, and having an intruded total specific void volume of 0.1-0.3 cm$^3$/g.

Another aspect of the present invention is to provide a mineral slurry for coating compositions, said slurry comprising mineral particles, said mineral particles, when in a densely compacted bed form, having a volume defined median pore diameter from 0.01 to 0.04 micrometer, and having an intruded total specific void volume of 0.1-0.3 cm$^3$/g.

Yet another aspect of the present invention is to provide a coating composition comprising a mineral composition which comprises mineral particles, said mineral particles, when in a densely compacted bed form, having a volume defined median pore diameter from 0.01 to 0.04 micrometer, and having an intruded total specific void volume of 0.1-0.3 cm$^3$/g.

Still another aspect of the present invention is to provide a filler for paper formulations, said filler comprising a mineral composition which comprises mineral particles, said mineral particles, when in a densely compacted bed form, having a volume defined median pore diameter from 0.01 to 0.04 micrometer, and having an intruded total specific void volume of 0.1-0.3 cm$^3$/g.

Yet another aspect of the present invention is to provide a paper comprising a coating composition, said coating composition comprising a mineral composition which comprises mineral particles, said mineral particles, when in a densely compacted bed form, having a volume defined median pore diameter from 0.01 to 0.04 micrometer, and having an intruded total specific void volume of 0.1-0.3 cm$^3$/g.

Another aspect of the present invention is to provide a paper comprising a filler, said filler comprising a mineral composition which comprises mineral particles, said mineral particles, when in a densely compacted bed form, having a volume defined median pore diameter from 0.01 to 0.04 micrometer, and having an intruded total specific void volume of 0.1-0.3 cm$^3$/g.

One aspect of the present invention relates to a method for producing a mineral particle fine fraction from a feed material, the mineral particle fine fraction, when in a densely compacted bed form, having a volume defined median pore diameter from 0.01 to 0.04 micrometer, and having an intruded total specific void volume of 0.1-0.3 cm$^3$/g, the method comprising:

provideing the feed material to a milling machine, producing a first milled feed material, feeding the first milled feed material to a disc stack centrifuge, producing two mineral particle fractions, one being the mineral particle fine fraction and a second being a mineral particle coarse fraction, either feeding a part or all of the mineral particle coarse fraction to a milling machine and/or to a disc stack centrifuge and/or taking off a part or all of the mineral particle coarse fraction.

Another aspect of the present invention relates to a method for producing a mineral particle fine fraction, the mineral particle fine fraction, when in a densely compacted bed form, having a volume defined median pore diameter from 0.01 to 0.04 micrometer, and having an intruded total specific void volume of 0.1-0.3 cm$^3$/g, the method comprising:

providing the feed material to one or more dry and/or wet grinding machines, producing said mineral particle fine fraction in one or more grinding steps.

Figure 1:
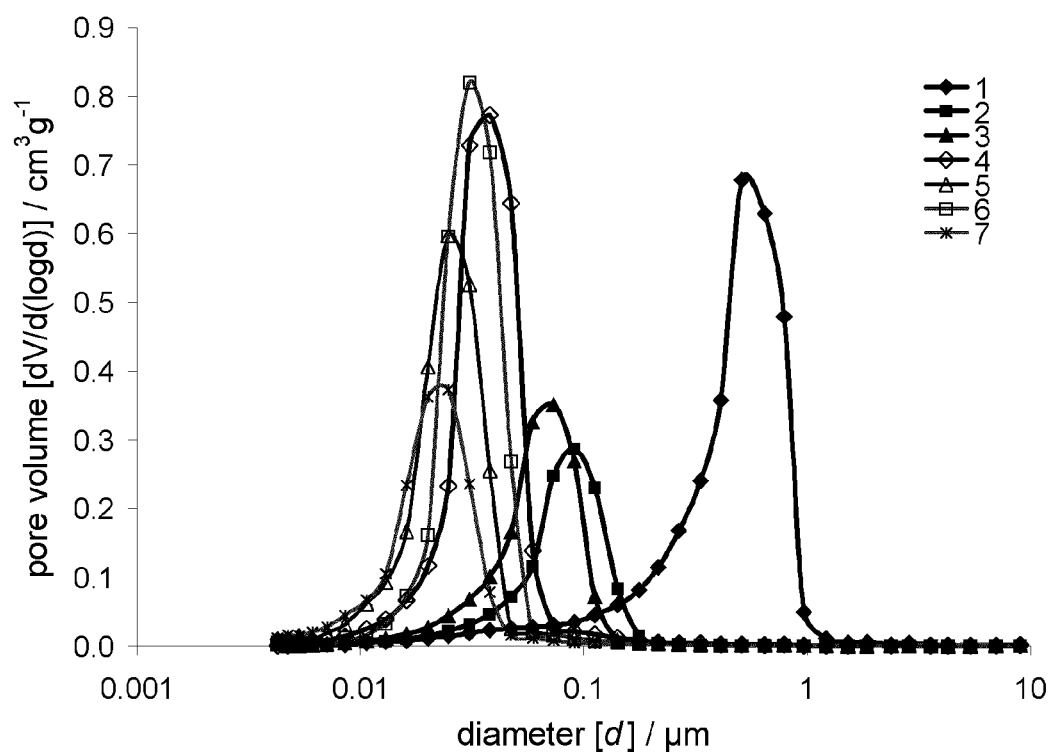
FIG. 1 shows Mercury intrusion curves of the samples 1-7.

The present invention will now be described in more detail in the following.

DETAILED DESCRIPTION OF THE INVENTION

Both offset paper and inkjet paper have been manufactured with properties that counteract spreading of the ink and, hence, promote good printability. However, currently available multipurpose office papers are often associated with an unsatisfactory inkjet, rotogravure or offset print quality.

Thus, there exists a demand for coated multipurpose papers and in particular for papers suitable for inkjet, rotogravure or offset applications, which give an improved print quality without a corresponding increase in production cost.

It is known that a charge difference between adsorbent and adsorbate, respectively the paper surface and the dye molecules, is generally used to promote dye adsorption. If mineral particles are present in the coating formulation, the inherent adsorptive properties of mineral particles towards ink dyes can offer another alternative to reduce the quantity of cationic additives necessary to ensure a given optical density. While prior art has focused almost solely on particle sizes, the inventors of the present invention have found that mean pore diameter of the mineral composition is of outmost importance for optimal adsorption.

Segregation of large ink/dye molecules on the paper surface is aided by surface size exclusion and a high pore volume coating, allowing the passage of ink solvent into the base paper while retaining the ink molecules on the surface. This suggests the need for a porous coating formulation. One object of the present invention is therefore to introduce mineral compositions with a carefully controlled pore size distribution and capillarity.

In the present context, the term "capillarity" is to be understood as a phenomenon where the ink solvent spontaneously flows in the pores formed by the mineral particles.

As a representative test system to describe the mineral composition comprising mineral particles, a densely compacted bed is formed in a wet tablet press apparatus (Gane et al. 2000, Ridgway et al. 2004) from a water slurry of the mineral particles by applying a constant pressure (15 bars) to the suspension/slurry until the water is released by filtration through a fine 0.025 μm filter membrane. This method produces tablets of about 4 cm in diameter, with a thickness of 1.5-2.0 cm, which can be divided and fashioned into suitable sample configurations for subsequent analysis. The tablets were removed from the apparatus and dried in an oven at 60° C. for 24 hours. The representative test system is generally accepted and disclosed in (1) Ridgway, C. J., Gane P. A. C., Schoelkopf, J. (2004): "Modified Calcium Carbonate Coatings With Rapid Absorption and Extensive Liquid Uptake Capacity", Colloids and Surfaces A, 236 (1-3), 91; (2) Gane, P. A. C., Kettle, J. P., Matthews, G. P. and Ridgway C. J. (1996): "Void Space Structure of Compressible Polymer Spheres and Consolidated Calcium Carbonate Paper-Coating Formulations", Industrial & Engineering Chemistry Research Journal 35 (5), 1753-1764; (3) Gane, P. A. C., J. Schoelkopf, D. C. Spielmann, G. P. Matthews, C. J. Ridgway, Tappi J. 83 (2000) 77.

Portions of each tablet are characterized by mercury porosimetry for porosity, intruded total specific void volume, and pore size distribution using a Micromeritics Autopore IV mercury porosimeter. A mercury porosimetry experiment entails the evacuation of a porous sample to remove trapped gases, after which the sample is surrounded with mercury. The amount of mercury displaced by the sample allows calculation of the sample's bulk volume, $V_{bulk}$. Pressure is then applied to the mercury so that it intrudes into the sample through pores connected to the external surface.

The maximum applied pressure of mercury was 414 MPa, equivalent to a Laplace throat diameter of 0.004 μm. The data is corrected using Pore-Comp for mercury and penetrometer effects, and also for sample compression. By taking the first derivative of the cumulative intrusion curves the pore size distributions based on equivalent Laplace diameter, inevitably including pore-shielding, are revealed. Volume defined median pore diameter is calculated from the Mercury intrusion curve, and FWHM is calculated from the pore size distribution curve. In the present context, the term "intruded total specific void volume" is to be understood as the void volume measured by the above procedure (mercury porosimetry).

In the present context the term "mineral composition" will refer to a composition comprising mineral particles in the form of single particles, i.e. in a non-granular form. The term "mineral" refers to an element or chemical compound that is normally crystalline, such as calcium carbonate.

In the context of the present invention, the term "pore" is to be understood as describing the space that is found between the mineral particles, i.e. that is formed by the mineral particles and that allows the passage or absorption of fluids. The pores can be defined by their median pore diameter.

Another object of the present invention is to introduce such optimal absorption of the ink solvent into the paper mass, by adding mineral compositions with a carefully controlled pore size distribution and capillarity as paper filler.

In the present context the term "volume defined median pore diameter" will refer to the pore size, below which 50% of the specific pore volume is finer than this Young-Laplace equation defined equivalent capillary diameter, where the Young-Laplace equation is applied to the mercury intrusion porosimetry data (the above procedure).

Also, in the context of the present invention, the term "intruded total specific void volume" is to be understood as describing the measured pore volume (that is found between the mineral particles) per unit mass of mineral particles.

The present invention comprises the finding that improved properties, can be obtained when a substrate, such as paper, is coated with a coating composition which includes a mineral composition comprising mineral particles, said mineral particles, when in a densely compacted bed form, having a volume defined median pore diameter from 0.01 to 0.04 micrometer, and having an intruded total specific void volume of 0.1-0.3 $cm^3/g$.

In the present context the term "substrate" is to be understood as any material having a surface suitable for printing or painting on, such as paper, cardboard, plastic, textile, wood, metal, concrete, or ointment.

In the present context, the term "plastic" relates to a natural or synthetic polymer material. Non limiting examples are polyethylene, polypropylene, polyvinylchloride, polyester, such as for example poly acrylic acid ester, homo or copolymers or mixtures thereof. The plastic may optionally be filled by a mineral filler, an organic pigment, an inorganic pigment or mixtures thereof.

In the present context, the term "textile" relates to a flexible material consisting of a network of natural or artificial fibres.

Thus, one aspect of the invention is to provide a mineral composition comprising mineral particles, said mineral particles, when in a densely compacted bed form, having a volume defined median pore diameter from 0.01 to 0.04 micrometer, and having an intruded total specific void volume of 0.1-0.3 $cm^3/g$.

In one embodiment of the present invention, the volume defined median pore diameter is within a range from 0.01 micrometer to 0.039 micrometer, and having an intruded total specific void volume within a range from 0.10 $cm^3/g$ to 0.28 $cm^3/g$, such as a volume defined median pore diameter within a range from 0.015 micrometer to 0.035 micrometer, and having an intruded total specific void volume within a range from 0.15 $cm^3/g$ to 0.27 $cm^3/g$, e.g. a volume defined median pore diameter within a range from 0.017 micrometer to 0.033, and having an intruded total specific void volume within a range from 0.20 $cm^3/g$ to 0.25 $cm^3/g$, such as a volume defined median pore diameter within a range from 0.019 micrometer to 0.030, and having an intruded total specific void volume within a range from 0.21 $cm^3/g$ to 0.24 $cm^3/g$.

In another embodiment of the present invention, the volume defined median pore diameter is within a range from 0.013 micrometer to 0.038 micrometer, e.g. within a range from 0.018 micrometer to 0.036 micrometer, such as within a range from 0.021 micrometer to 0.034 micrometer, e.g. within a range from 0.023 micrometer to 0.028 micrometer.

In still another embodiment of the present invention, the intruded total specific void volume is within a range from 0.10 $cm^3/g$ to 0.29 $cm^3/g$, e.g. within a range from 0.11 $cm^3/g$ to 0.28 $cm^3/g$, such as within a range from 0.12 $cm^3/g$ to 0.27 $cm^3/g$ e.g. within a range from 0.13 $cm^3/g$ to 0.26 $cm^3/g$, such as within a range from 0.14 $cm^3/g$ to 0.26 $cm^3/g$, e.g. within a range from 0.15 $cm^3/g$ to 0.25 $cm^3/g$, such as within a range from 0.16 $cm^3/g$ to 0.25 $cm^3/g$, e.g. within a range from 0.17 $cm^3/g$ to 0.24 $cm^3/g$, such as within a range from 0.18 $cm^3/g$ to 0.23 $cm^3/g$, e.g. within a range from 0.19 $cm^3/g$ to 0.22 $cm^3/g$, such as within a range from 0.20 $cm^3/g$ to 0.21 $cm^3/g$.

The term "monomodal pore size distribution" as used herein refers to a collection of pores which have a single clearly discernable maxima on a pore size distribution curve (intensity on the ordinate or Y-axis, and pore size on the abscissa or X-axis). A bimodal pore size distribution refers to a collection of pores having two clearly discernable maxima on a pore size distribution curve. A generalised definition is, therefore, an n-modal pore size distribution referring to a collection of pores having n clearly discernable maxima on the pore size distribution curve, where n is an integer. The inventors of the present invention have found that one can obtain a better control of absorption speed through the mineral composition of multi viscous ink solvent mixtures when utilizing an n-modal pore size distribution, where n≥2 (higher than or equal to two).

The term "volume defined pore size polydispersity" is to be understood as a characteristic describing the breadth of distribution of pore size diameters to be found between the mineral particles. The inventors of the present invention have found that one can obtain a better control of absorption speed through the mineral composition when the volume defined pore size polydispersity, expressed as full width at maximum height (FWMH), is in the range of 0.01 to 0.03 micrometer.

A full width at half maximum (FWHM) is an expression of the extent of a function, given by the difference between the two extreme values of the independent variable at which the dependent variable is equal to half of its maximum value. The technical term Full-Width Half-Maximum, or FWHM, is used to approximate the diameter distribution of the majority of the pores, i.e. the polydispersity of the pore sizes. The inventors of the present invention have found that one can obtain a better control of speed of the ink solvent in the pores/capillaries when the pores are of uniform size compared to a broader size distribution.

In one embodiment of the present invention, the mineral particles, when in a densely compacted bed form, are having are monomodal pore diameter distribution and a volume defined pore size polydispersity expressed as full width at maximum height (FWMH) of less than, or equal to, 0.035 micrometer, such as within a range from 0.005 micrometer to 0.033 micrometer, e.g. 0.030 micrometer, such as from 0.01 micrometer to 0.028 micrometer, e.g. 0.025 micrometer, such as from 0.015 micrometer to 0.021 micrometer, e.g. 0.020 micrometer, such as from 0.016 micrometer to 0.019 micrometer.

In one embodiment of the present invention, the mineral particles, when in a densely compacted bed form, are having bimodal or multimodal pore diameter distribution.

In another embodiment of the present invention, the mineral particles, when in a densely compacted bed form, are having monomodal pore diameter distribution.

In still another embodiment of the present invention, the mineral particles comprise calcium carbonate, in particular chosen among natural calcium carbonate or precipitated calcium carbonate or their mixtures. Preferably, the mineral particles comprise calcium carbonate such as PCC (precipitated calcium carbonate), modified calcium carbonate (as notably in WO 00/39222, WO 2004/083316, WO 2005/121257) or GCC (ground calcium carbonate) and combinations thereof.

In the present context the term "mineral slurry" will refer to a particle suspension of the mineral composition in liquid, preferably water. Preferably, the mineral has a higher specific weight expressed in g/ml versus the liquid.

Another aspect of the present invention is to provide a mineral slurry for coating compositions, said slurry comprising mineral particles, said mineral particles, when in a densely compacted bed form, having a volume defined median pore diameter from 0.01 to 0.04 micrometer, and having an intruded total specific void volume of 0.1-0.3 $cm^3/g$.

Yet another aspect of the present invention is to provide a coating composition comprising a mineral composition which comprises mineral particles, said mineral particles, when in a densely compacted bed form, having a volume defined median pore diameter from 0.01 to 0.04 micrometer, and having an intruded total specific void volume of 0.1-0.3 $cm^3/g$.

Still another aspect of the present invention is to provide a filler for paper formulations, said filler comprising a mineral composition which comprises mineral particles, said mineral particles, when in a densely compacted bed form, having a volume defined median pore diameter from 0.01 to 0.04 micrometer, and having an intruded total specific void volume of 0.1-0.3 $cm^3/g$.

Yet another aspect of the present invention is to provide a paper comprising a coating composition, said coating composition comprising a mineral composition which comprises mineral particles, said mineral particles, when in a densely compacted bed form, having a volume defined median pore diameter from 0.01 to 0.04 micrometer, and having an intruded total specific void volume of 0.1-0.3 $cm^3/g$.

Another aspect of the present invention is to provide a paper comprising a filler, said filler comprising a mineral composition which comprises mineral particles, said mineral particles, when in a densely compacted bed form, having a volume defined median pore diameter from 0.01 to 0.04 micrometer, and having an intruded total specific void volume of 0.1-0.3 $cm^3/g$.

In another embodiment of the present invention, the formulation of the mineral composition is selected from the group consisting of a coating composition, filler, surface filling, and a mineral slurry, said mineral composition comprising mineral particles, said mineral particles, when in a densely compacted bed form, having a volume defined median pore diameter from 0.01 to 0.04 micrometer, and having an intruded total specific void volume of 0.1-0.3 $cm^3/g$.

Another aspect of the present invention relates to a substrate comprising a mineral composition which comprises mineral particles, said mineral particles, when in a densely compacted bed form, having a volume defined median pore diameter from 0.01 to 0.04 micrometer, and having an intruded total specific void volume of 0.1-0.3 $cm^3/g$.

In one embodiment of the present invention, the substrate comprises one or more formulations of the mineral composition, said formulation being selected from the group consisting of a coating composition, filler, surface filling, and a mineral slurry or mixtures thereof.

In another embodiment of the present invention, the substrate is selected from the group consisting of paper, cardboard, plastic, textile, wood, metal, concrete, or ointment.

One aspect of the present invention relates to the use of a mineral composition which comprises mineral particles, said mineral particles, when in a densely compacted bed form, having a volume defined median pore diameter from 0.01 to 0.04 micrometer, and having an intruded total specific void volume of 0.1-0.3 $cm^3/g$ in paper, cardboard, plastic, textile, wood, metal, concrete, or ointment.

Another aspect of the present invention relates to the use of a mineral composition which comprises mineral particles, said mineral particles, when in a densely compacted bed form, having a volume defined median pore diameter from 0.01 to 0.04 micrometer, and having an intruded total specific void volume of 0.1-0.3 $cm^3/g$ in paper application like paper manufacturing, paper coating, ink jet paper top-coating, offset printing.

Yet another aspect of the present invention relates to the use of a mineral composition which comprises mineral particles, said mineral particles, when in a densely compacted bed form, having a volume defined median pore diameter from 0.01 to 0.04 micrometer, and having an intruded total specific void volume of 0.1-0.3 $cm^3/g$ in textile and cardboard application.

In another embodiment of the present invention, the substrate comprises one or more blends of mineral particle compositions according to the present invention.

One aspect of the present invention relates to a method for producing a mineral particle fine fraction from a feed material, the mineral particle fine fraction, when in a densely compacted bed form, having a volume defined median pore diameter from 0.01 to 0.04 micrometer, and having an intruded total specific void volume of 0.1-0.3 $cm^3/g$, the method comprising:
  providing the feed material to a milling machine, producing a first milled feed material,
  feeding the first milled feed material to a disc stack centrifuge, producing the two mineral particle fractions, one being the mineral particle fine fraction and a second being a mineral particle coarse fraction,
  either feeding a part or all of the mineral particle coarse fraction to a milling machine and/or to a disc stack centrifuge and/or taking off a part or all of the mineral particle coarse fraction.

In one embodiment of the present invention, the mineral particle coarse fraction, when in a densely compacted bed form, having a volume defined median pore diameter different from 0.01 to 0.04 micrometer, and having an intruded total specific void volume different from 0.1-0.3 $cm^3/g$.

In another embodiment of the present invention, the mineral particle coarse fraction has a lower specific surface area ($m^2/g$) than the mineral particle fine fraction, such as in the range of 0.1 to 100 times lower, e.g. 2 times lower, such as in the range of 5-95 times lower, e.g. 10 times lower, such as in the range of 15-85 times lower, e.g. 20 times lower, such as in the range of 25-75 times lower, e.g. 30 times lower, such as in the range of 35-65 times, e.g. 50 times lower than the mineral particle fine fraction.

In still another embodiment of the present invention, the feed material has a feed solids range of less than 99% by weight of the feed material, such as in the range of 5%-90%, e.g. 10%, preferably in the range of 15%-85%, e.g. 19%, such as in the range of 20%-80%, e.g. 25%, more preferably in the range of 30%-75%, e.g. 35%, such as in the range of 40%-70%, e.g. 45%, preferably in the range of 50%-65%, e.g. 55% by weight of the feed material.

A particular embodiment of the present invention is characterised in that the method for producing a mineral particle fine fraction, the mineral particle fine fraction, when in a densely compacted bed form, having a volume defined median pore diameter from 0.01 to 0.04 micrometer, and having an intruded total specific void volume of 0.1-0.3 cm$^3$/g, comprises the following steps:

providing the feed material to a milling machine, producing a first milled feed material, feeding the first milled feed material into a disc stack centrifuge, producing two mineral particle fractions, one being the mineral particle fine fraction and a second being a mineral particle coarse fraction, wherein the first milled feed material has a solids contents in the range of 20%-80% by weight, preferably in the range of 30%-75% by weight, more preferably in the range of 38%-70% by weight.

The step of feeding the mineral particle coarse fraction to the disc stack centrifuge can in certain embodiments be repeated until that it is impossible or unfavourable to separate more mineral particle fine fraction from the mineral particle coarse fraction. The mineral fine fraction of a repeated feeding of the mineral particle coarse fraction to the disc stack centrifuge can be identical, coarser or finer than an earlier one. The different mineral particle fine fractions can be used separately or in blends of different mineral particle fine fractions.

Another aspect of the present invention relates to a method for producing a mineral particle fine fraction, the mineral particle fine fraction, when in a densely compacted bed form, having a volume defined median pore diameter from 0.01 to 0.04 micrometer, and having an intruded total specific void volume of 0.1-0.3 cm$^3$/g, the method comprising:

providing the feed material to one or more dry and/or wet grinding machines, producing said mineral particle fine fraction in one or more grinding steps.

In one embodiment of the present invention, the process functions in a continuous manner.

Figure 3:
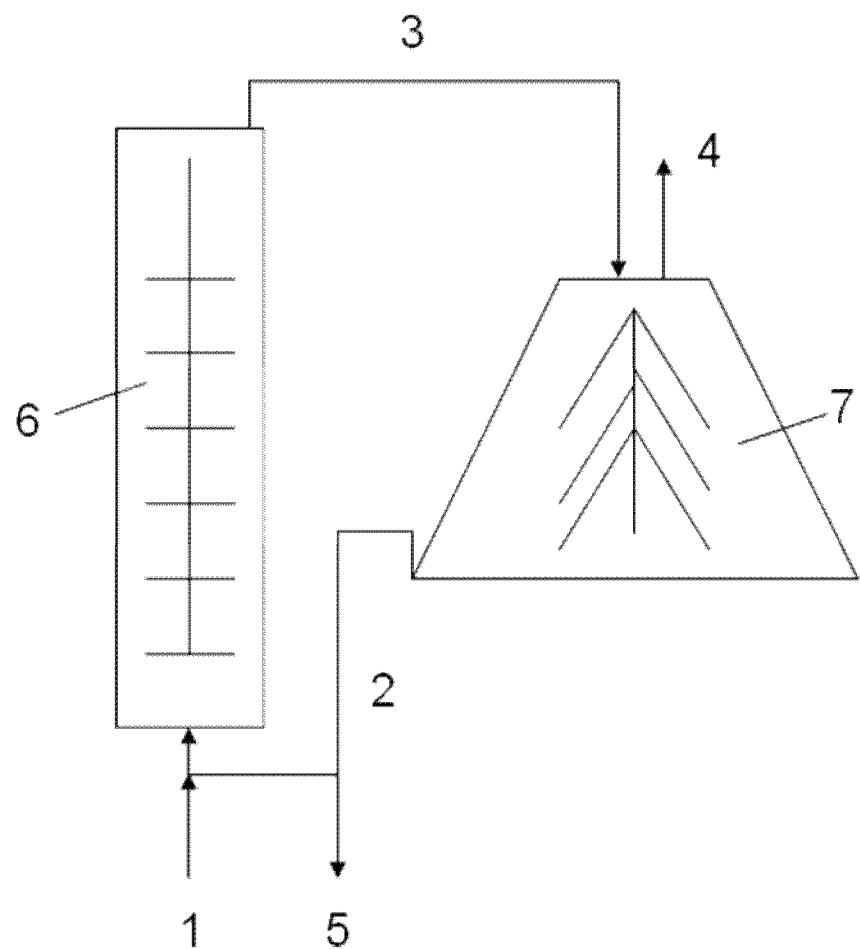
FIG. 3 shows an example of a process for producing the mineral particles of the present invention.

An example of a method for producing the mineral particles of the present invention is shown in FIG. 3, where the feed material (1) is fed to a milling machine (6), producing a first milled feed material (3). The first milled feed material (3) is then fed to a disc stack centrifuge (7), producing the mineral particle fine fraction (4) and a mineral particle coarse fraction (2). The mineral particle coarse fraction (2) can be separated as a coarse fraction product (5), or fed back to the milling machine (6).

In one embodiment of the present invention, the mineral particle fine fraction, when in a densely compacted bed form, has a monomodal pore diameter distribution. In another embodiment of the present invention, the mineral particle fine fraction, when in a densely compacted bed form, has a volume defined pore size polydispersity expressed as full width at maximum height (FWMH) in the range of 0.01 to 0.03 micrometer.

In still another embodiment of the present invention, the mineral particle fine fraction, when in a densely compacted bed form, has a bi- or multimodal pore diameter distribution.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

EXAMPLES

General Information to the Examples

All particle sizes and median diameters are measured using Malvern Mastersizer 2000 S, Malvern Instruments Ltd., Enigma Business Park, Grovewood Road, Malvern, Worcestershire, UK. WR14 1XZ using the following parameters:

PSD (Particle Size Distribution) Sample Measurement Procedure

Prerequisites:
    Instrument: Malvern Mastersizer 2000S with HydroS sampling unit.
    ASTM Type II water is used as dilution water.
    Malvern Mastersizer has been cleaned and has no contamination from cationic charged material.
    The instrument has been properly set-up and aligned.
    The instrument is operated by an experienced and trained operator.
    A sample check standard on similar material to be measured has been tested and validated prior to measurement.
    Sample to be measured is fully homogenized.
    Instrument Measurement options set to the following
        Particle Refractive Index: 1.570
        Particle Refractive Index blue light: 1.570
        Dispersant Name: Water
        Analysis model: General Purpose, irregular
        Absorption: 0.005
        Absorption blue light: 0.005
        Dispersant Refractive Index: 1.330
        Sensitivity: Normal
        Size Range: 0.020-2000.000
        Number of result bands: 66
        Result Emulation: Not enabled
        Result units: Microns
        Background and background blue-light measurement time: 15 sec.
        Test time: 15 sec 1.1. Equipment Preparation
1.1.1. Run Malvern through 3 cleaning cycles.
1.1.2. When cleaning cycles are complete, in the accessories module, click on the "Empty" Button and allow the Hydro S to drain.
1.1.3. When Hydro S is drained, close the drain valve by clicking on the "Drain Valve" Button.
1.1.4. Slowly add ASTM Type II water into the hydro S until the box next to "Liquid Sensed" becomes green.
1.1.5. Ramp pump speed to 3010 rpm. Maintain this speed during measurement.
1.1.6. Continue to fill void with ASTM type II water.
1.1.7. Before pressing start, add a small amount (~1 ml) of ~35% concentration by weight of a sodium/calcium polyacrelate dispersant having a molecular weight (Mw) of 5500 and a polydispersity of 2.7 into the Hydro S sample unit.
1.1.8. Allow Dispersant to circulate for at least 1 minute before adding sample to be measured.
1.2. Sample measurement.
1.1. No Sonication to be used before or during sample measurement.

1.2. When instrument is ready for measurement, add sample using a 3 ml Syringe until an Obscuration of 13-25, preferably 20 is attained.
1.3. When adding sample take care to not splash sample or do anything else that may introduce air bubbles.
1.4. Start analysis.
1.5. In case of questionable results, run instrument check standard to ensure that the instrument is running properly.

In Example 5 also a Sedigraph 5100 was use for the results given in weight %.

The BET specific surface area in m$^2$/g is measured according to the standard ISO 4652 method (1994).

All weight, molecular weights (Mw), number molecular weights (Mn) and corresponding polydispersity of the different polymers are measured as 100 mol % sodium salt at pH 8 according to an aqueous Gel Permeation Chromatography (GPC) method calibrated with a series of five sodium polyacrylate standards supplied by Polymer Standard Service with references PSS-PAA 18K, PSS-PAA 8K, PSS-PAA 5K, PSS-PAA 4K and PSS-PAA 3K.

Examples Representing Prior Art

Example 1

By a hammer mill dry crushed and further dry ground and air cyclone-classified marble from the region of Villach, Austria, featuring a $d_{50}$ of 3.0 μm, a $d_{98}$ of 12.5 μm and a specific surface area of 2.3 m$^2$/g. The dry grinding process in a ball mill using Silpex beads of 2.5 cm includes the use of 1000 ppm in respect to dry calcium carbonate of a triethanolamine-based dry grinding aid.

The fraction <2 μm was 30.3 volume %, and the fraction <1 μm was 5.6 volume %.

Example 2

Autogenic wet ground Vermont Marble, having a $d_{50}$ of 45 μm, is wet ground to a a $d_{50}$ of 2.2 μm. The wet grinding is done at 78 weight % solids in tap water in a vertical attritor mill of a volume of 1500 liter in a continuous mode, using zircon silicate beads of 1-1.5 mm and using 0.63 wt % of a sodium/calcium polyacrylate dispersant having a molecular weight (Mw) of 5500 and polydispersity of 2.7. That means in total 0.70 weight % of sodium/calcium polyacrylate in respect to dry calcium carbonate. The final product further had a $d_{98}$ of 13.0 μm and a specific surface area of 6.0 m$^2$/g. The fraction <2 μm was 46.3 volume %, and the fraction <1 μm was 22.6 volume %.

Example 3

The product of Example 2 was further wet ground using the same mill conditions as in Example 2 to a $d_{50}$ of 0.31 μm. The wet grinding is done at 72 weight % solids in tap water in a vertical attritor mill of a volume of 1500 liter in a continuous mode, using zircon silicate beads of 1-1.5 mm and using 0.42 wt % of a sodium/calcium polyacrylate dispersant having a molecular weight (Mw) of 5500 and polydispersity of 2.7. The final product further had a $d_{98}$ of 3.4 μm and a specific surface area of 10.5 m$^2$/g. The fraction <2 μm was 87.7 volume %, and the fraction <1 μm was 60.3 volume %.

Examples Representing the Invention

Example 4

The finely ground Marble of Example 2 was treated in a Westfalia "Teller-Düsen Separator" at feed solids of 38 weight % solids after dilution with tap water to reach a $d_{98}$ of 0.25 μm, $d_{90}$ of 0.20 μm and $d_{50}$ of 0.125 μm. The procedure was performed as described by Erich Müller, Mechanische Trennverfahren, Band 2, Otto Salle Verlag, Frankfurth, 1983, part 4.3 Zentrifugen in Tellerseparatoren page 65 ff, especially on page 78 Abb. 4.31.

Example 5

The finely ground Marble of Example 2 was treated in a Westfalia "Teller-Düsen Separator" at feed solids of 60.9 weight % solids after dilution with tap water to reach a $d_{98}$ of 0.225 μm and $d_{50}$ of 0.123 μm. The procedure was performed as described by Erich Müller, Mechanische Trennverfahren, Band 2, Otto Salle Verlag, Frankfurth, 1983, part 4.3 Zentrifugen in Tellerseparatoren page 65 ff, especially on page 78 Abb. 4.31.

Example 6

The finely ground Marble of Example 2 was treated in a Westfalia "Teller-Düsen Separator" at feed solids of 68.6 weight % solids after dilution with tap water to reach a $d_{98}$ of 0.295 μm and $d_{50}$ of 0.122 μm. The procedure was performed as described by Erich Müller, Mechanische Trennverfahren, Band 2, Otto Salle Verlag, Frankfurth, 1983, part 4.3 Zentrifugen in Tellerseparatoren page 65 ff, especially on page 78 Abb. 4.31.

Example 7

The product of Example 1 was made down into tap water to 75 weight % solids using 0.25 weight % of a sodium/calcium polyacrylate dispersant having a molecular weight (Mw) of 5500 and polydispersity of 2.7 and further wet ground using the same mill conditions as in Example 2 to a $d_{50}$ of 0.12 μm. The wet grinding is done at 45 weight % solids in tap water in a vertical attritor mill of a volume of 1500 liter in a continuous mode, using (Cermill) zircon silicate beads of less than 0.315 mm and using 1.4 wt % of a sodium/calcium polyacrylate dispersant having a molecular weight (Mw) of 5500 and polydispersity of 2.7. The final product further had a $d_{98}$ of 0.57 μm and a specific surface area of 35.8 m$^2$/g. The fraction <0.5 μm was 97.5 volume % and fraction <0.1 μm was 37.5 volume %. The final product further had a $d_{90}$ of 0.90 μm.

The fraction less than 0.5 μm was 96 weight % and the fraction <0.2 μm was 71 weight % both measured by Sedimentation using a Sedigraph 5100, Micromeritics.

Example 8

The finely ground Marble of Example 3 was treated in a Westfalia "Teller-Düsen Separator" at feed solids of 38 weight % solids to reach a $d_{98}$ of 0.25 μm, $d_{90}$ of 0.2 μm and $d_{50}$ of 0.12 μm. The procedure was performed as described by Erich Müller, Mechanische Trennverfahren, Band 2, Otto Salle Verlag, Frankfurth, 1983, part 4.3 Zentrifugen in Tellerseparatoren page 65 ff, especially on page 78 Abb. 4.31 The fraction <0.5 μm was >99.5 volume %.

Example 9

50 tons of autogenic dry ground Canadian Marble (origin of the region of Perth) with a $d_{50}$ of 45 μm and originally a part of acid insoluble silicates and silica of 6.5 weight % was passing a froth flotation process to reduce the acid insol. part to >1 weight % by using 500 ppm in respect to total crude Marble, of tallow fatty imidazoline as silicate collector, is wet ground at 72 weight % solids in presence of 3.0 wt % of a sodium/magnesium polyacrylate dispersant (Mw of 5500, polydispersity of 2.7) in a batch mode in the same kind of an attritor mill as in Example 2 to a fineness until 99 weight % of the particles having a diameter less than 1 μm, 88 weight % of the particles having a diameter <0.5 μm, 69 weight % of the particles having a diameter <0.2 μm, and 28 weight % of the particles having a diameter <0.1 μm. Specific surface area was measured to 28.2 m2/g, (BET), d90 was 0.58 μm, and $d_{50}$ was 0.12 μm.

Results:
Formation of a Densely Compacted Bed (Compacted Tablet)

As a representative test system to describe the mineral composition comprising mineral particles, a densely compacted bed is formed in a wet tablet press apparatus from a water slurry of the mineral particles by applying a constant pressure (15 bars) to the suspension/slurry until the water is released by filtration through a fine 0.025 μm filter membrane. This method produces tablets of about 4 cm in diameter, with a thickness of 1.5-2.0 cm, which can be divided and fashioned into suitable sample configurations for subsequent analysis. The tablets were removed from the apparatus and dried in an oven at 60° C. for 24 hours.

Figure 2:
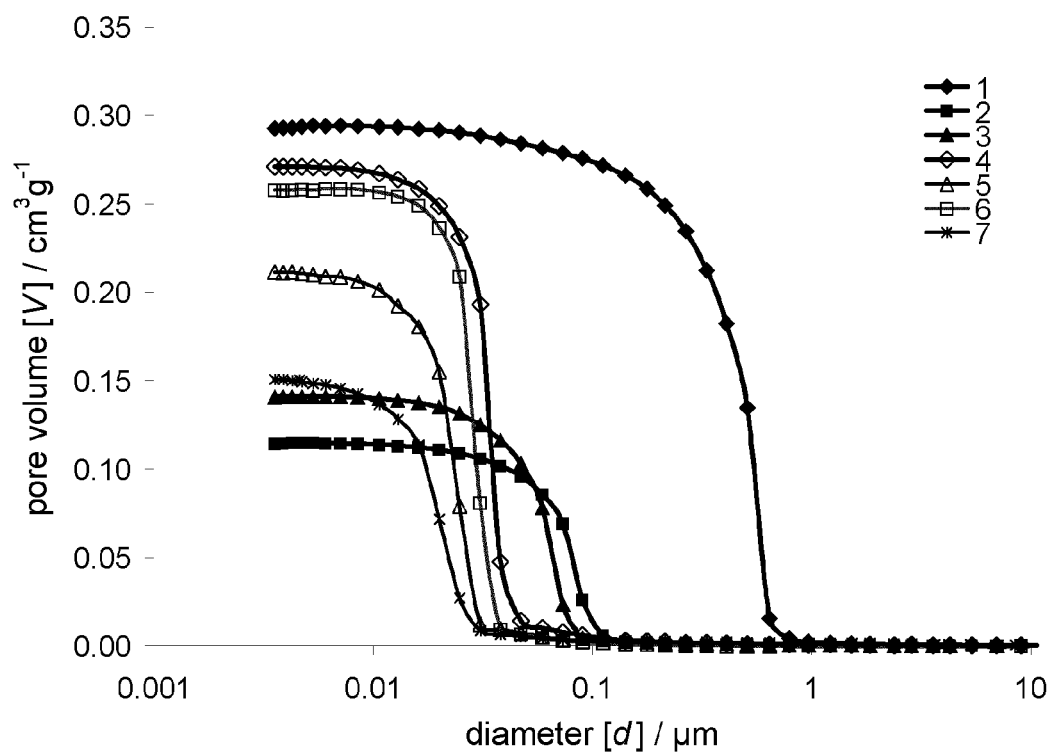
FIG. 2 shows pore size distribution curves of the samples 1-7.

Portions of each tablet were characterized by mercury porosimetry for porosity, intruded total specific void volume, and pore size distribution using a Micromeritics Autopore IV mercury porosimeter. The maximum applied pressure of mercury was 414 MPa, equivalent to a Laplace throat diameter of 0.004 μm. The data is corrected using Pore-Comp for mercury and penetrometer effects, and also for sample compression. By taking the first derivative of the cumulative intrusion curves the pore size distributions based on equivalent Laplace diameter, inevitably including pore-shielding, are revealed. Volume defined median pore diameter is calculated from the Mercury intrusion curve, and FWHM is calculated from the pore size distribution curve (FIGS. 1 and 2).

TABLE 1

Collected data from the examples 1-9.

| Sample $CaCO_3$ | Intruded total specific void volume/cm³g⁻¹ | Volume defined median pore diameter/μm | Full-Width Half-Maximum (FWHM) pore size distribution/μm Shows the degree of uniformity of the median pore size diameter |
|---|---|---|---|
| 1 | 0.292 | 0.50 | 0.440 |
| 2 | 0.114 | 0.09 | 0.067 |
| 3 | 0.140 | 0.06 | 0.051 |
| 4 | 0.271 | 0.04 | 0.026 |
| 7 | 0.211 | 0.02 | 0.019 |
| 8 | 0.258 | 0.03 | 0.022 |
| 9 | 0.150 | 0.02 | 0.018 |

Example 10

Use of the Product from Example 4 in an Inkjet Paper Top-Coating on a Porous Pre-Coat (High Quality Inkjet Application)

Paper Pre-Coating

Paper Coater used: Erichsen K 303, Multicoater and corresponding rods for the equipment, both available at company Ericrson, D-58675 Hemen, Germany.

An inkjet base paper 112 g/m², Schoeller, Osnabrück, Germany, was pre-coated with 10 g/m² of the following formulation using rod N° 3:
86.5 wt. % Omyajet B6606-FL 31% (modified calcium carbonate), Omya AG, Switzerland
4.5 wt. % PVA BF-05**
4.5 wt. % C-Film 05978, Cargill SA, Geneva (cationic starch)
4.5 wt. % Certrex, Mobil, (PolyDADMAC)
Coating colour solids was approximately 30 wt. %.

The coating was dried at 110° C. for 10 min. All wt. % are calculated dry on dry.

On top of this pre-coat the prior art or inventive product were applied using rods N° 1 to 3.

Preparation of Top-Coating

The coating colours were run at similar binder amount and were diluted to approximately 25-30 weight % for good rheological properties and similar coat weight. The fumed silica* appeared to be somewhat difficult to apply on the paper at 30 weight % solids.

|  | Prior art (wt % dry on dry) | Invention (wt % dry on dry) |
|---|---|---|
| Product of Example 4 | 0 | 85.5 |
| Aerodisp W 7330 N * | 85.5 | 0 |
| PVA BF-05 ** | 14.5 | 14.5 |
| Coating colour solids | 25.3 | 30.2 |

Table 2: Top-coating formulations of prior art and the present invention,
* Aerosil ® fumed silica, Evonic,
** 98 mol % hydrolysed Polyvinylalcohol, low viscosity, ChangChun Groupe, South Korea.

Results
Optical Print Density

| | OD Sum (/) *** | | |
|---|---|---|---|
| | Coat weight 3 g/m² | Coat weight 6 g/m² | Coat weight 10 g/m² |
| Example 4 | 14 | 15 | 15 |
| Prior art | 11 | 13 | 14 |

Table 3: Optical density printed with Canon,
*** Optical density Spectrolino ™, Spectrophotometer, Handhel system, GretagMacbeth ™ (OD sum = sum of cyan, magenta and yellow)

| | OD Sum (/) *** | |
|---|---|---|
| | Coat weight 6 g/m² | Coat weight 10 g/m² |
| Example 4 | 13.5 | 13.5 |
| Prior art | 12 | 11.5 |

Table 4: Optical density printed with HP,
*** Optical density Spectrolino ™, Spectrophotometer, Handhel system, GretagMacbeth ™ (OD sum = sum of cyan, magenta and yello)

Gloss
Uncalandered Tappi 75° (%) ISO Norm 8254-1

TABLE 5

| | uncalandered Paper gloss | |
|---|---|---|
| | Coat weight 6 g/m² | Coat weight 10 g/m² |
| Example 4 | 43 | 52 |
| Prior art | 20 | 18 |

The present results show clearly the performance of inventive product of Example 4 versus fumed silica used as reference pigments.

The results indicate that the print density is improved versus fumed silica. Furthermore, calcium carbonate products according to the present invention can be applied by using PVOH binder without rheological problems.

The gloss development of the carbonate products according to the present invention is more than two times better than commercial fumed silica references.

Example 11

Use of the Product from Example 3 and 8 in Offset Printing

Paper Coater used: Erichsen K 303, Multicoater, D-58675 Hemen, Germany.

A synthetic paper (YUPO Synteape, polypropylene, 62 g/m², 80 μm, halbmatt, weiss) Fischer Papier, 9015 St. Gallen, Switzerland) was coated with approximately 10 g/m² using rod N° 2 and 45 g/m² using rod N° 5 of the following formulation:
86.5 wt. % of product (either from example 3 or 8)
13.5 wt. % Styrene-Acrylate Binder (Acronal® S 360 D, BASF)
Coating colour solids was approximately 60 wt. %.

The coating was dried at 110° C. for 30 min. All wt. % are calculated dry on dry. The resulting coat weights in m²/g were as follows:

|  | Example 8 | Example 3 |
| --- | --- | --- |
| Rod 2: | 9.6 m²/g | 10.9 m²/g |
| Rod 5: | 42.6 m²/g | 45.0 m²/g |

The results are the average of 3 measurements.

The tack force developments of the four coatings have been measured using the Ink Surface Interaction Tester (ISIT) to compare and evaluate their tack behaviour.

Ink-on-paper tack is measured by a special attachment (SeGan Ltd.) which consists of a solenoid, a coil spring, a load cell and a contact disc. The contact disc is pressed against the print on the sample platen by electromagnetic force acting on the solenoid. This action applies an extensional force on the coil spring mounted in parallel with the solenoid. Contact time and force can be varied by electronic controls to optimize adhesion between contact disc and print. At cessation of the electromagnetic force the contact disc is retracted from the print by the strain force of the extended coil spring, strong enough to achieve separation of the disc from the ink film. The strain gauge, fixed between contact disc and coil spring, generates a load-dependent signal which is recorded as the measured tack force. The sequence is automatically repeated for a predefined number of cycles chosen to span the regions of the tack force under study. The build-up of the tensile force required to achieve each individual separation is recorded with time and can be analyzed through specifically designed software. The maximum level of tensile force at each test point is plotted as measured tack force development with time.

Figure 4:
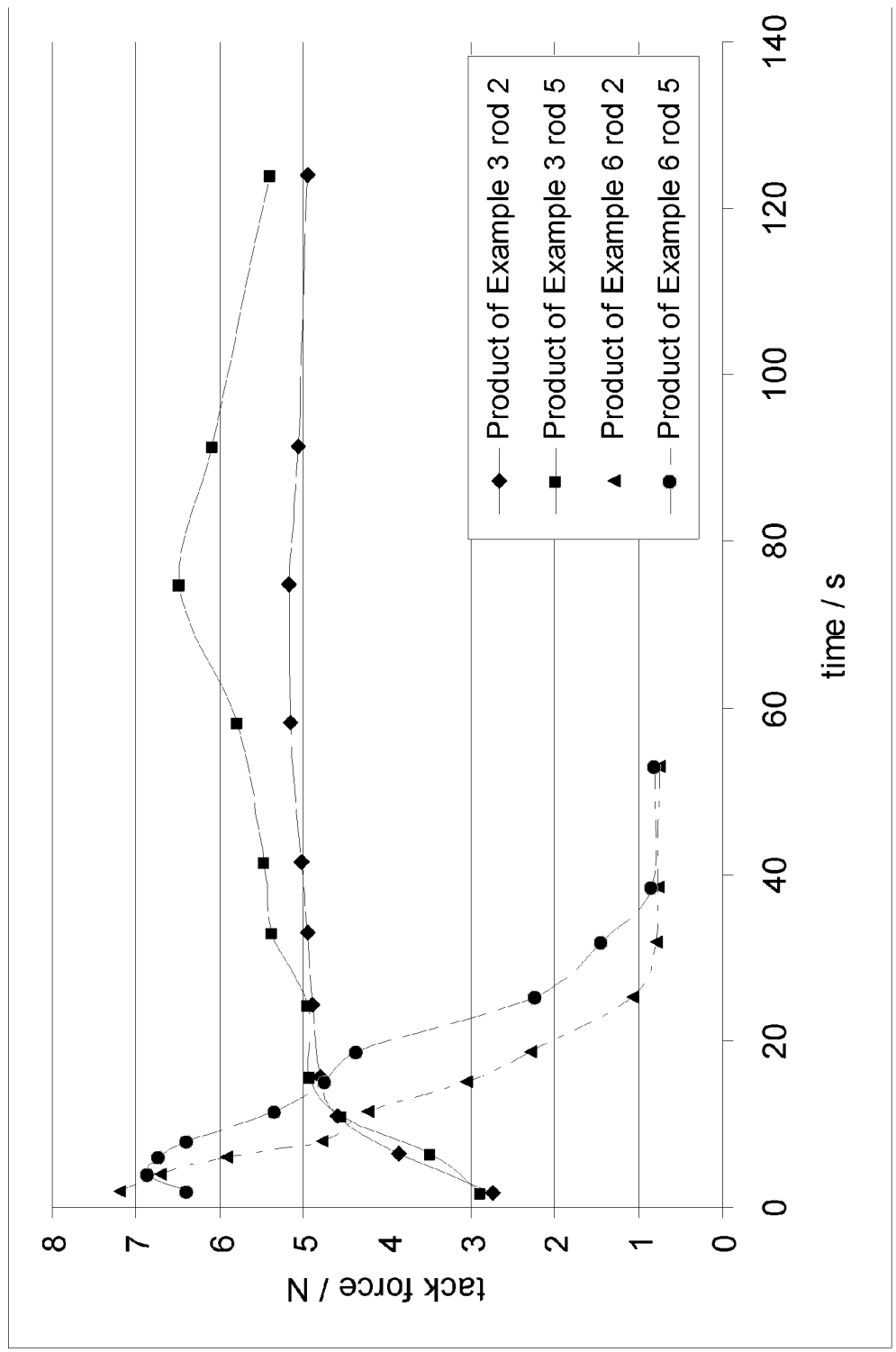
FIG. 4 shows Tack Force Development curves of product coatings based on examples 3 and 6.

The results (FIG. 4) show clearly that the tack force of the coating with the inventive product of Example 8 decreases to below 1N in only 40 sec. After that period of time the printing is not sticky anymore, whereas the coating of the prior art product of Example 3 is not even back down after 150 sec and still sticky.

Example 12

Use of the Product from Example 7 in Recycled Board Topcoats

Three coating colours were formulated to compare the partial replacement of the titanium dioxide of the standard formulation by the calcium carbonate of example 7 according to the invention.

Coating Colour formulation n° 1: Standard coating colour formulation
72.0 wt % Hydrafin Clay from Kamin LLC
8.0 wt % Calcined Clay Ansilex 93 from Engelhard
20.0 wt % Rutile TiO2
16 wt % latex P308 from Rohm & Haas
5 wt % protein binder Procote 200 from Protein Technologies International
0.7 wt % crosslinker ACZ 5800M from Akzo Nobel/Eka Chemicals
0.15 wt % polyacrylate dispersant Colloids 211 from Kemira Chemicals, Inc.
Coating colour solids was approximately 43 wt %.

Coating Colour formulation n° 2 according to the invention:
72.0 wt % Hydrafin Clay from Kamin LLC
8.0 wt % Calcined Clay Ansilex 93 from Engelhard
18.0 wt % Rutile TiO2
2.0 wt % calcium carbonate according to the example 7
16 wt % latex P308 from Rohm & Haas
5 wt % protein binder Procote 200 from Protein Technologies International
0.7 wt % crosslinker ACZ 5800M from Akzo Nobel/Eka Chemicals
0.15 wt % of polyacrylate dispersant Colloids 211 from Kemira Chemicals, Inc.
Coating colour solids was approximately 43 wt %.

Coating Colour formulation n° 3 according to the invention:
72.0 wt % Hydrafin Clay from Kamin LLC
8.0 wt % Calcined Clay Ansilex 93 from Engelhard
16.0 wt % Rutile TiO2
4.0 wt % calcium carbonate according to the example 7
16 wt % latex P308 from Rohm & Haas
5 wt % protein binder Procote 200 from Protein Technologies International
0.7 wt % crosslinker ACZ 5800M from Akzo Nobel/Eka Chemicals
0.15 wt % of polyacrylate dispersant Colloids 211 from Kemira Chemicals, Inc.
Coating colour solids was approximately 43 wt %.

Coating Colour formulation n° 4 according to the invention:
70.2 wt % Hydrafin Clay from Kamin LLC
7.8 wt % Calcined Clay Ansilex 93 from Engelhard
16.0 wt % Rutile TiO2
8.0 wt % calcium carbonate according to the example 7
16 wt % latex P308 from Rohm & Haas
5 wt % protein binder Procote 200 from Protein Technologies International
0.7 wt % crosslinker ACZ 5800M from Akzo Nobel/Eka Chemicals
0.15 wt % of polyacrylate dispersant Colloids 211 from Kemira Chemicals, Inc.
Coating colour solids was approximately 43 wt %.

Coating Colour formulation n° 5 according to the invention:
72.0 wt % Hydrafin Clay from Kamin LLC
8.0 wt % Calcined Clay Ansilex 93 from Engelhard 14.0 wt % Rutile TiO2
6.0 wt % calcium carbonate according to the example 7
16 wt % latex P308 from Rohm & Haas
5 wt % protein binder Procote 200 from Protein Technologies International
0.7 wt % crosslinker ACZ 5800M from Akzo Nobel/Eka Chemicals
0.15 wt % of polyacrylate dispersant Colloids 211 from Kemira Chemicals, Inc.
Coating colour solids was approximately 43 wt %.

Coating Colour formulation n° 6 according to the invention:
72.0 wt % Hydrafin Clay from Kamin LLC
8.0 wt % Calcined Clay Ansilex 93 from Engelhard
12.0 wt % Rutile TiO2
8.0 wt % calcium carbonate according to the example 7
16 wt % latex P308 from Rohm & Haas
5 wt % protein binder Procote 200 from Protein Technologies International
0.7 wt % crosslinker ACZ 5800M from Akzo Nobel/Eka Chemicals
0.15 wt % of polyacrylate dispersant Colloids 211 from Kemira Chemicals, Inc.
Coating colour solids was approximately 43 wt %.
(All wt % are calculated dry on dry of the total mineral materials).

Three top-coatings of a recycled cardboard were performed by applying on the cardboard sheet the dried coating weight of each of the formulations in the amount listed in Table 6 by using a RK Printcoat Instruments K Control Coater Model K202 with the following procedure:
1.1 The samples should be conditioned for a minimum of 24 hours at TAPPI Standard Conditions (50%±2% Relative Humidity & 23° C. ±1° or 73.4° F.±1.8°). 1.2 Follow the instructions for setting up the instrument for testing and calibrate the instrument as per the instructions. 1.3 Place the conditioned samples sheets with the machine direction of the board parallel to the face of the Brightimeter over the sample opening on top of the instrument, place the 1 kg weight on the sample and press the PRINT key for a single reading, or if an average is required initiate the AVERAGE routine and follow the instrument prompts. 1.4 All the tests listed below can be accessed by programming the instrument according to the directions in the manual.

1.5 Do an average of ten (10) samples and record the average±standard deviation.

Brightness Results

Brightness, when coated sample is placed over the black side of a Leneta FiberBoard from Leneta Company (Form N2C-2 B#3701 Unsealed Opacity Charts (194×260 mm) or 7⅝×10¼ inches) is determined according to the following method:

Drawdowns:
1. place the Leneta Board on the drawdown coater, holding it down with the metal clamp (much like a clip board)
2. place the proper size Meyer rod under the swing arms and on top of the Leneta Board3. apply a bead of coating in front of the rod using a 10 cc or larger syringe
4. turn on the coater and flip the switch causing the rod to "draw down" the length of the Leneta Board
5. adjust the speed and rod size to achieve the desired coat weight and film uniformity (may take several iterations)
6. set aside the Meyer rod for cleaning and proceed to dry the freshly coated Leneta Board Drying
1. Using the heat gun (Veritemp Heat Gun Model VT-750C Master Appliance Corp.), "blow" dry the Leneta Board while still in place on the drawdown coater
2. dry until the coating goes from a wet look to a dull, dry look
3. turn on the felt drum dryer (Felt Roll Drum Dryer Adirondack Machine Corp.).
4. then, using the felt drum dryer, place the Leneta Board coated side against the drum (the goal of blow drying is to avoid any sticking of this coating on the drum)
5. with the felt drum drying turning, allow the Leneta Board to pass in to the nip (between drum and felt) and wrap around to the other side, where it comes out.
6. place dried Leneta Board to the side for brightness testing or coat weight determination The results are given in the following Table 6.

TABLE 6

Brightness R457 TAPPI measured with Technidyne Corp. Brightimeter Micro S-5 Model S-5/BOC Serial # 452266.

| | Standard Formulation n° 1 | Invention Formulation n° 2 | Invention Formulation n° 3 | Invention Formulation n° 4 | Invention Formulation n° 5 | Invention Formulation n° 6 |
|---|---|---|---|---|---|---|
| Brightness R457 TAPPI | 69.3 | 77.0 | 75.9 | 76.6 | 74.7 | 73.3 |
| Standard Deviation | 1.2 | 0.6 | 0.6 | 0.6 | 0.6 | 0.6 |
| Coating weight g/m² | 3.1 | 3.2 | 3.2 | 3.4 | 3.3 | 3.3 |

The present results show clearly the performance of the product according to the invention.

The results indicate that the brightness of a coated recycled board is improved by replacing a part of the titanium dioxide by the calcium carbonate according to the invention. Furthermore, calcium carbonate products according to the present invention can be applied without rheological problems.

The invention claimed is:
1. A mineral composition comprising mineral particles comprising calcium carbonate, said mineral particles, when in a densely compacted bed form, have a volume defined median pore diameter from 0.01 to 0.04 micrometer, an intruded total specific void volume of 0.1 to 0.3 cm³/g, a monomodal pore diameter distribution, and a volume defined pore size polydispersity expressed as full width at maximum height (FWMH) in the range of 0.01 to 0.03 micrometer.

2. The mineral composition according to claim 1, wherein said mineral particles, when in a densely compacted bed form, have a volume defined median pore diameter from 0.01 to 0.039 micrometer, and an intruded total specific void volume of 0.10 to 0.28 cm$^3$/g.

3. The mineral composition according to claim 1, wherein said mineral particles, when in a densely compacted bed form, have a volume defined median pore diameter from 0.015 to 0.035 micrometer, and an intruded total specific void volume of 0.15 to 0.27 cm$^3$/g.

4. The mineral composition according to claim 1, wherein said mineral particles, when in a densely compacted bed form, have a volume defined median pore diameter from 0.017 to 0.033 micrometer, and an intruded total specific void volume of 0.20 to 0.25 cm$^3$/g.

5. The mineral composition according to claim 1, wherein said mineral particles, when in a densely compacted bed form, have a volume defined median pore diameter from 0.019 to 0.030 micrometer, and an intruded total specific void volume of 0.21 to 0.24 cm$^3$/g.

6. The mineral composition according to claim 1, wherein said mineral particles, when in a densely compacted bed form, have a volume defined pore size polydispersity expressed as full width at maximum height (FWMH) in the range of 0.01 to 0.028 micrometer.

7. The mineral composition according to claim 1, wherein said mineral particles, when in a densely compacted bed form, have a volume defined pore size polydispersity expressed as full width at maximum height (FWMH) in the range of 0.015 to 0.021 micrometer.

8. The mineral composition according to claim 1, wherein said mineral particles, when in a densely compacted bed form, have a volume defined pore size polydispersity expressed as full width at maximum height (FWMH) in the range of 0.016 to 0.019 micrometer.

9. The mineral composition according to claim 1, wherein the mineral particles comprise natural calcium carbonate, precipitated calcium carbonate, or a mixture thereof.

10. The mineral composition according to claim 1, wherein the mineral particles comprise natural calcium carbonate.

11. The mineral composition according to claim 1, in the form of a coating composition, filler, surface filling, or a mineral slurry.

* * * * *